US009728189B2

United States Patent
Fujibayashi

(10) Patent No.: US 9,728,189 B2
(45) Date of Patent: Aug. 8, 2017

(54) INPUT AUXILIARY APPARATUS, INPUT AUXILIARY METHOD, AND PROGRAM

(75) Inventor: Toshihiko Fujibayashi, Kawasaki (JP)

(73) Assignee: NEC Corporation, Tokyo (JP)

( * ) Notice: Subject to any disclaimer, the term of this patent is extended or adjusted under 35 U.S.C. 154(b) by 228 days.

(21) Appl. No.: 14/113,897

(22) PCT Filed: Mar. 27, 2012

(86) PCT No.: PCT/JP2012/002099
§ 371 (c)(1),
(2), (4) Date: Oct. 25, 2013

(87) PCT Pub. No.: WO2012/147274
PCT Pub. Date: Nov. 1, 2012

(65) Prior Publication Data
US 2014/0052441 A1 Feb. 20, 2014

(30) Foreign Application Priority Data

Apr. 26, 2011 (JP) .................................. 2011-098254

(51) Int. Cl.
*G10L 15/24* (2013.01)
*G06F 17/24* (2006.01)
(Continued)

(52) U.S. Cl.
CPC ............ *G10L 15/24* (2013.01); *G06F 17/241* (2013.01); *G06F 17/2785* (2013.01);
(Continued)

(58) Field of Classification Search
CPC ..... G10L 15/265; G10L 17/241; G10L 15/26; G10L 15/24; G10L 25/63; G10L 17/2785; H04M 1/72522; H04M 2250/74
See application file for complete search history.

(56) References Cited

U.S. PATENT DOCUMENTS 6,453,294 B1   9/2002 Dutta et al.
7,203,648 B1 * 4/2007 Ostermann ............. G10L 13/00
                                              704/260
(Continued)

FOREIGN PATENT DOCUMENTS

JP       07-244496 A      9/1995
JP       09-251453 A      9/1997
(Continued)

OTHER PUBLICATIONS

European Search Report corresponding to European Patent Application No. 12776328.2, dated Mar. 4, 2015, 6 pages.
(Continued)

*Primary Examiner* — Angela A Armstrong
(74) *Attorney, Agent, or Firm* — Wilmer Cutler Pickering Hale and Dorr LLP

(57) ABSTRACT

An object of the present invention is to provide an input auxiliary apparatus equipped with an input section to input character strings; an embellishment information retaining section to retain embellishment information on a plurality of postures in a storing section in advance to link each posture with the embellishment information; a posture detecting section to detect the posture; a reading section to read out the embellishment information linked with the posture detected by the posture detecting section from the storing section; and an embellishment applying section to apply the embellishment information read out by the reading section to the character strings. The input section preferably includes a speech recognition section to recognize voice data based on speech recognition and convert the voice data to the character strings. Accordingly, this enables emotions of a speaker to be correctly judged and suitable embellishments to be appended when performing speech recognition.

5 Claims, 10 Drawing Sheets

(51) Int. Cl.
*G06F 17/27* (2006.01)
*G10L 15/26* (2006.01)
*H04M 1/725* (2006.01)
*G10L 25/63* (2013.01)

(52) U.S. Cl.
CPC .............. *G10L 15/26* (2013.01); *G10L 25/63* (2013.01); *H04M 1/72544* (2013.01); *H04M 2250/74* (2013.01)

(56) References Cited

U.S. PATENT DOCUMENTS

| | | |
|---|---|---|
| 7,382,868 B2 | 6/2008 | Moore et al. |
| 8,260,967 B2 | 9/2012 | Moore et al. |
| 8,281,239 B2 * | 10/2012 | Kuhl .................... G06F 3/0236 715/705 |
| 8,289,951 B2 | 10/2012 | Moore et al. |
| 8,880,401 B2 | 11/2014 | Moore et al. |
| 8,885,799 B2 | 11/2014 | Moore et al. |
| 8,924,217 B2 | 12/2014 | Moore et al. |
| 2003/0185232 A1 | 10/2003 | Moore et al. |
| 2003/0185359 A1 | 10/2003 | Moore et al. |
| 2003/0185360 A1 | 10/2003 | Moore et al. |
| 2003/0187641 A1 | 10/2003 | Moore et al. |
| 2003/0187650 A1 | 10/2003 | Moore et al. |
| 2003/0187800 A1 | 10/2003 | Moore et al. |
| 2003/0193961 A1 | 10/2003 | Moore et al. |
| 2004/0003041 A1 | 1/2004 | Moore et al. |
| 2005/0074101 A1 | 4/2005 | Moore et al. |
| 2006/0015812 A1 * | 1/2006 | Cunningham ........ G06F 3/0219 715/263 |
| 2008/0027984 A1 | 1/2008 | Perdomo et al. |
| 2008/0216022 A1 * | 9/2008 | Lorch .................. G06F 3/04817 715/847 |
| 2009/0144366 A1 * | 6/2009 | Lyle ..................... G06Q 10/107 709/204 |
| 2011/0006977 A1 | 1/2011 | Khosravy et al. |
| 2011/0200179 A1 | 8/2011 | Moore et al. |
| 2011/0202347 A1 | 8/2011 | Moore et al. |
| 2011/0212717 A1 * | 9/2011 | Rhoads ............. G06F 17/30241 455/420 |
| 2015/0022549 A1 | 1/2015 | Khosravy et al. |

FOREIGN PATENT DOCUMENTS

| | | |
|---|---|---|
| JP | 2002-278671 A | 9/2002 |
| JP | 2006-259641 A | 9/2006 |
| JP | 2006-318413 A | 11/2006 |
| JP | 2009-224950 A | 10/2009 |
| JP | 2009-271613 A | 11/2009 |
| JP | 2011-061582 A | 3/2011 |

OTHER PUBLICATIONS

International Search Report of PCT/JP2012/002099 mailed May 15, 2012 (2 pages).
European Office Action issued by the European Patent Office for Application No. 12776328.2 dated Jul. 29, 2016 (4 pages).

* cited by examiner

INPUT AUXILIARY APPARATUS, INPUT AUXILIARY METHOD, AND PROGRAM

CROSS-REFERENCE TO RELATED APPLICATIONS

This application is a national stage application of International Application No. PCT/JP2012/002099 entitled "Input Auxiliary Apparatus, Input Auxiliary Method, and Program," filed on Mar. 27, 2012, which claims the benefit of the priority of Japanese patent application No. 2011-098254, filed on Apr. 26, 2011, the disclosures of each of which are hereby incorporated by reference in their entirety.

TECHNICAL FIELD

The present invention relates to an input auxiliary apparatus, an input auxiliary method, and a program to provide a desired embellishment for character strings to which speech recognition is applied.

BACKGROUND ART

Speech recognition (Speech Recognition) is processing by which speech language which a person speaks is analyzed by computers, and the content to be spoken is taken out as character data. In the case of speech recognition for Japanese-language conversion, for example, when "Hello" is pronounced, the content to be spoken can be converted to the character strings corresponding to "Hello".

Incidentally, in the case of face-to-face talks, when "Hello" is pronounced, the emotions of a speaker can be transmitted to a counterpart by the speaker's expression or intonation of the voice of the speaker. However, in the case of the speech recognition, the emotions cannot be transmitted due to mere character strings. Accordingly, the following words "I'm fine" and the like are required to be added, in order to transmit the emotions to a reader who reads the character strings, which complicates the content to be spoken and makes it likely to lead to an error in the speech recognition.

As a method of transmitting the emotions without incurring the complication of the content to be spoken, "embellishment" is included. The typical embellishment is an emoticon. For example, when character strings which seem as if it were a smiling face ((ˆ-ˆ); also referred to as smiley) are provided after the character strings of "Hello", the emotion of the speaker (joy corresponding to vigor in this case) can be transmitted to the reader.

When this embellishment is applied to the speech recognition, for example, it is conceivable that "smiling face" is pronounced, and the voice to be pronounced is recognized, and the corresponding embellishment (smiley in this case) is provided.

However, regarding this method, it is necessary to register voice data for collation to recognize respective embellishments in advance. There is a drawback in that the capacity of voice data for collation increases as the number of types of embellishments increases, which require more memory space. Moreover, it is necessary for the user to remember the vocalization corresponding to the voice data for collation, which is a drawback in that poor usability is provided.

Accordingly, there has been demanded an embellishment input technology which does not cause the deletion of memory space and has high usability.

From this background, for example, Patent Document 1 below discloses a technology in which, when voice is recognized and converted into character strings, an emotion involved in the voice is assumed, and embellishments such as the pictograph, which represents the emotion, are added to the character strings. Similarly, Patent Document 2 discloses a technology in which the eagerness or the emotion of a person who inputs characters is assumed based on keystroke speeds, keystroke intensity, and keystroke frequency at the time of inputting the characters, and modification information such as emoticon corresponding to assumption results is added to the character strings. Similarly, Patent Document 3 discloses a technology in which an e-mail transmission apparatus detects vibration of its own and transmits e-mail in which vibration information is added, and an e-mail reception apparatus generates the vibration having intensity corresponding to the vibration information when the e-mail reception apparatus regenerates the e-mail. Similarly, Patent Document 4 discloses a technology in which the displacement patterns of a cellular phone apparatus (for example, pushing down the cellular phone apparatus forwardly, drawing in a circle with the cellular phone apparatus, and shaking the cellular phone apparatus laterally) are detected, and e-mail auxiliary input information (a short sentence, a sample sentence and the like) corresponding to the displacement patterns to be detected is listed and displayed.

PRIOR ART DOCUMENTS

Patent Documents

Patent Document 1: JP 2006-259641
Patent Document 2: JP 2006-318413
Patent Document 3: JP 2009-224950
Patent Document 4: JP 2009-271613

SUMMARY OF INVENTION

Problem to be Solved by the Invention

However, the technology disclosed by Patent Document 1 is aimed at "assuming the emotions involved in the voice", but there is a drawback in that the assumption naturally includes an error, and the emotions cannot be assumed with adequate accuracy because only a simplified estimation engine can originally be mounted on a small-size portable apparatus such as a cellular phone apparatus. This drawback is revealed especially when the speech recognition is carried out in the presence of persons. Most persons speak with their emotions restrained because they are concerned about the people surrounding them, so that most persons speak in a singsong manner or in a monotonous voice close to the speaking in the singsong manner, which decreases assumption accuracy and makes it impossible to properly judge the emotions. Accordingly, the technology disclosed by Patent Document 1 has a problem to be solved in view of the incapability of proper judgment in terms of the emotions.

The technology disclosed by Patent Document 2 is based on the keystroke speeds, the keystroke intensity, and the keystroke frequency. In short, this keystroke information is obtained by handwork, which is incompatible with the speech recognition which is used to get rid of the handwork in the first place. Even when the handwork and the speech recognition are combined, the sound of keystrokes considerably reduces the accuracy of the speech recognition, so that the combination of the handwork and the speech recognition is not practical. Similarly, the technology disclosed by Patent Document 3 is nothing but the transmission of the vibration to the counterpart. The intentions of the vibration, that is, intentions or feelings which need to be transmitted to the counterpart, are not clear, which makes it impossible to serve as an effective means for transmitting the intentions. Similarly, the technology disclosed by Patent Document 4 merely displays the list of e-mail auxiliary input information (short sentence, sample sentence, or the like) corresponding to the displacement patterns. Although the labor of displaying the list is alleviated, this does not make any contribution in that the emotions of the speaker are properly judged in a case where the speech recognition is applied, and appropriate embellishments are added.

Therefore, it is an object of the present invention to provide an input auxiliary apparatus, an input auxiliary method, a program, which adequately judges the emotions of a speaker in a case where speech recognition is applied and provides appropriate embellishments.

Means for Solving the Problem

The present invention provides an input auxiliary apparatus, comprising: an input section for inputting character strings, an embellishment information retaining section for retaining embellishment information on a plurality of postures in a storing section in advance in a manner to link each posture with the embellishment information, a posture detecting section for detecting the posture, a reading section for reading out the embellishment information linked with the posture detected by the posture detecting section from the storing section; and an embellishment applying section for applying the embellishment information read out by the reading section to the character strings.

The present invention provides an input auxiliary method, comprising: an input step of inputting character strings, an embellishment information retaining step of retaining embellishment information on a plurality of postures in a storing section in advance in a manner to link each posture with the embellishment information, a posture detecting step of detecting the posture, a reading step of reading out the embellishment information linked with the posture detected by the posture detecting section from the storing section; and an embellishment applying step of applying the embellishment information read out by the reading step to the character strings.

The present invention provides A non-transitory computer-readable storage medium having a program stored thereon which causes a computer to function as: an input section for inputting character strings, an embellishment information retaining section for retaining embellishment information on a plurality of postures in a storing section in advance in a manner to link each posture with the embellishment information, a posture detecting section for detecting the posture, a reading section for reading out the embellishment information linked with the posture detected by the posture detecting section from the storing section; and an embellishment applying section for applying the embellishment information read out by the reading section to the character strings.

Effect of the Invention

According to one aspect of the present invention, the emotions of a speaker in a case where speech recognition is applied are adequately judged, thereby providing appropriate embellishments.

DESCRIPTION OF EMBODIMENTS

Figure 1:
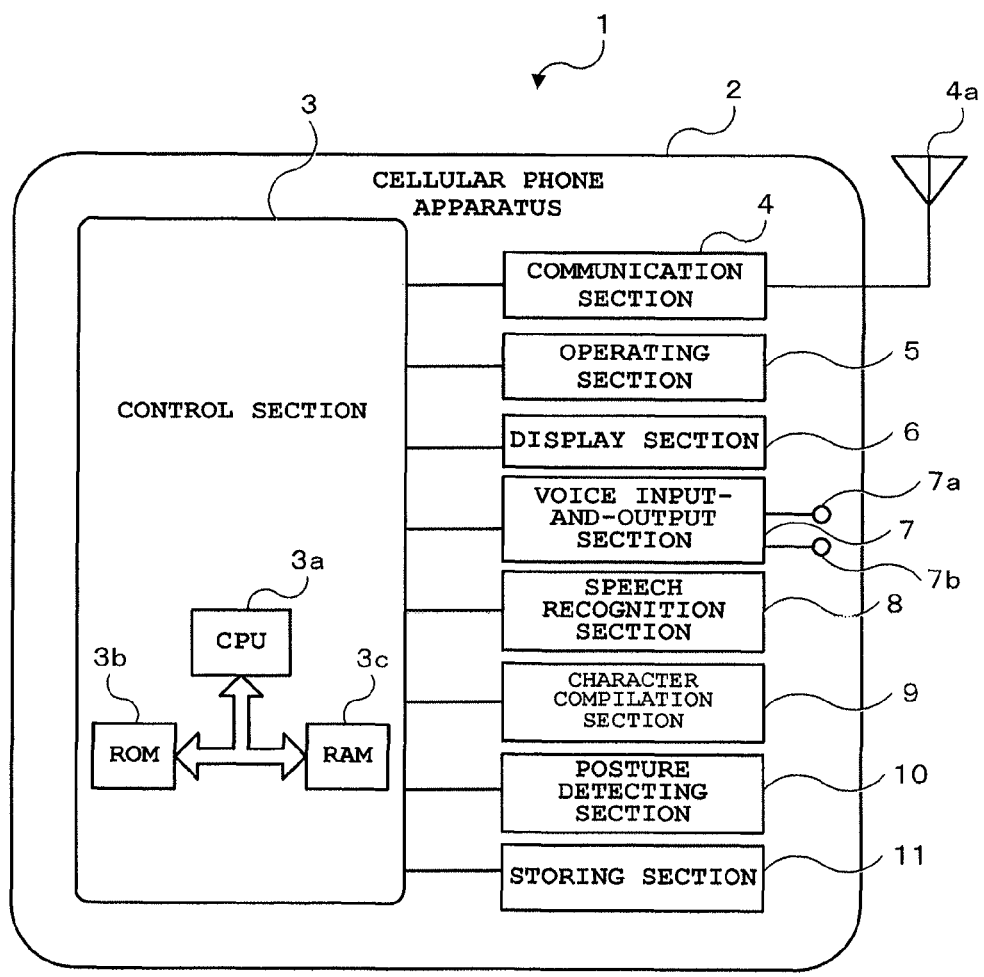
FIG. 1 is a configuration view of a cellular phone apparatus 1.

Hereinafter, the embodiment of the present invention will be described referring to the drawings, based on an example where a cellular phone apparatus is applied. FIG. 1 is a configuration view of a cellular phone apparatus 1. In the diagram, the cellular phone apparatus 1 includes a body 2 having a shape which is suitable for being held by hands, and the body 2 includes a control section 3, a communication section 4, an operating section 5, a display section 6, a voice input-and-output section 7, a speech recognition section 8, a character compilation section 9, a posture detecting section 10, and a storing section 11 therein. Although not illustrated, a power source section which includes a battery to supply power to each section is provided in the inside of the body 2, and when desired, a photographing section such as a camera and a position detecting section such as a GPS reception section may be provided in the body 2.

The control section 3 is a control element of a program control scheme, which is constituted by a computer (hereinafter referred to as CPU) 3a, a non-volatile memory (hereinafter referred to as ROM) 3b, a high-speed processing memory (hereinafter referred to as RAM) 3c, and their corresponding peripheral circuits (not illustrated). The control section 3 reads out control programs (basic programs, various application programs, and the like) stored in the ROM 3b in advance into the RAM 3c and executes the control programs by the CPU 3a, thereby realizing various functions required for the cellular phone apparatus 1 by means of software. The ROM (that is, read-only exclusive type non-volatile memory) is exemplified as the non-volatile memory, but is not limited to this. The memory may be a non-volatile memory in which the content to be held is not lost even when the power is turned off. For example, a non-volatile memory of a one-time writing type or an erasable writing type may be applied.

The communication section 4 carries out the transmission and reception of digital data between the cellular phone apparatus 1 and the nearest the cellular phone base station (not illustrated) via an antenna 4a, with the control of the control section 3 by radio based on a predetermined frequency bandwidth and a predetermined modulation scheme. The digital data includes information on the transmission and reception of e-mail and browsing information on various Internet contents, and service information on necessary network services, in addition to information on the incoming and outgoing calls and information on voice calls with regards to the cellular phone.

The operating section 5 is an input section for user interface, and for example, includes multiple-use buttons which are used for telephone number input and character input, various function buttons, a cursor operation key, and the like. In response to a user's operation, an input signal corresponding to the button or the key is generated and outputted to the control section 3.

The display section 6 is made up of a flat two-dimensional display device such as a liquid crystal panel (preferably, made up of a device including a high-definition and multi-color display screen) and vividly displays the display information appropriately outputted from the control section 3 on the screen thereof. The display section 6 may include a touch screen of a capacitance type or a resistive film type. In this case, the touch screen constitutes part of the operating section 5.

The voice input-and-output section 7 converts an audio signal, which is picked up by a microphone 7a, into digital data based on the control of the control section 3 and outputs the digital data to the control section 3, or converts a digital audio signal, which is outputted from the control section 3, into an analog signal and outputs amplified voice from a speaker 7b. The microphone 7a and the speaker 7b are used for transmission and reception regarding the cellular phone. Further, the microphone 7a is also used for a voice input section in a case where the speech recognition is applied for sentences such as e-mail.

When sentences such as the e-mail are generated based on the speech recognition, the speech recognition section 8 takes in the audio data picked up by the microphone 7a via the voice input-and-output section 7 and the control section 3, converts the audio data into character strings, and outputs the character strings to the control section 3. Herein, the speech recognition section 8 is illustrated in a separate block diagram, but is not limited to this. A mode which is realized by means of software based on the CPU 3a of the control section 3 may be applied, or a mode in which the speech recognition section 8 is provided as an external speech recognition server as a service may be applied. Hereinafter, in the embodiment of the present invention, in order to simplify the description, the mode of the separate block (speech recognition section 8) as illustrated is applied.

The character compilation section 9 provides a compilation function in a case where the sentences such as the e-mail are generated. Compilation is generally meant by the generation and modification of the sentences by handwork, but the compilation by the character compilation section 9 further includes the readjustment of part of the sentences generated based on "speech recognition". Specifically, the compilation is meant such that part of the sentences is deleted, or characters are added, or the orders of the words are replaced, in response to an input signal from the operating section 5. Similarly, the compilation may include the embellishment described in the opening paragraph of the present specification. That is, for example, the embellishment such as emoticons may be added, as needed, in response to the input signal from the operating section 5. However, this compilation (compilation based on the input signal from the operating section 5) is based on handwork, which impedes the effects of the speech recognition (which does not involve handwork). Accordingly, although fine readjustment which includes the deletion and addition of characters is unavoidably carried out by handwork, it is preferable that the embellishment be provided with the use of the technology characteristic of the embodiment of the present invention described below (addition of the embellishment based on posture detection).

The posture detecting section 10 detects information regarding the posture of the cellular phone apparatus 1 and outputs the detection results to the control section 3. The posture of the cellular phone apparatus 1 is classified into two types, which are made up of "static" and "dynamic". The static posture is the direction or inclination of the cellular phone apparatus 1 at the time of detection, and the dynamic posture is the direction and displacement amount in change from a first posture to a second posture and its change speed. Hereinafter, when "posture" is simply used, the posture generically means both the static posture and the dynamic posture. In particular, when required, the posture is distinguished between the static posture (or a motionless posture) and the dynamic posture (or a kinetic posture).

A three-axis acceleration sensor which can measure the acceleration vectors in the three-axis directions regarding XYZ-coordinates at once can be applied to the posture detecting section 10. The three-axis acceleration sensor includes various types such as a piezoresistance type, a capacitance type, and a heat detection type, any of which may be applied. An appropriate sensor may be selected and used in view of measurement accuracy, responsiveness, costs, and mounting size.

Acceleration is meant by a rate of change in speed per unit time. Negative acceleration (opposite to the travelling direction) is generally referred to as "deceleration". However, the acceleration in both directions is equal exclusive of a difference in polarity (direction). "Static posture" can be detected based on the acceleration vectors in the three-axis directions regarding XYX-coordinates, and "dynamic posture" can be detected in consideration of the rate of change in acceleration per section time (increase in acceleration).

The storing section 11 is a storing element constituted by a non-volatile and rewritable mass-storage device (for example, flash memory, silicon disk, or hard disk), and rewritably retains various data (a character-string embellishment data base 12, a speech recognition information storing table 18, and the like, which are described later) required for the technology (addition of embellishment based on posture detection) characteristic of the embodiment of the present invention.

Next, various data retained in the storing section 11 will be described. As is described above, in the storing section 11, the character-string embellishment data base 12, the speech recognition information storing table 18, and the like are rewritably retained as various data required for the technology (addition of embellishment based on posture detection) characteristic of the embodiment of the present invention.

Figure 2:
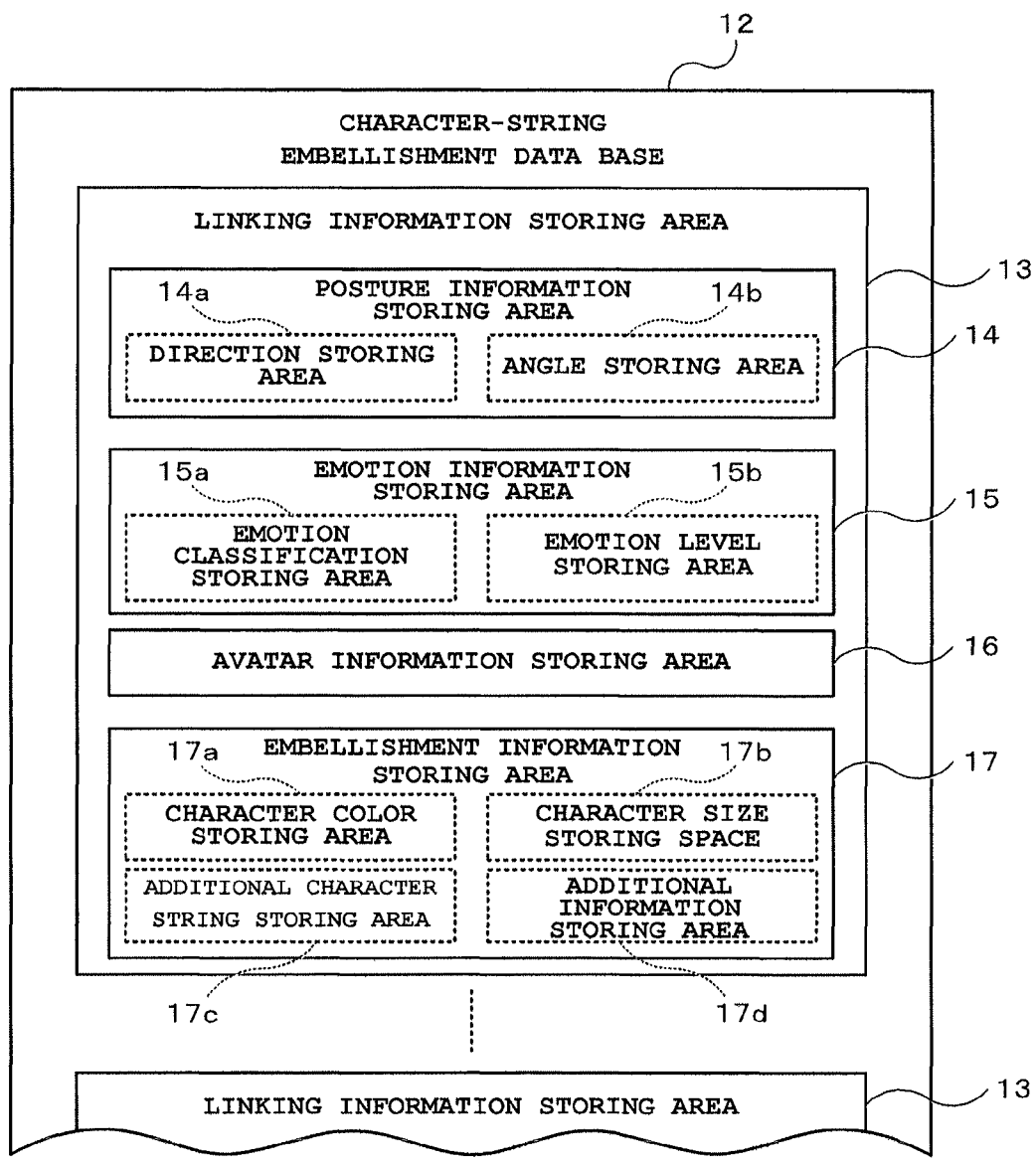
FIG. 2 is a conceptual configuration diagram of a character-string embellishment data base 12.

FIG. 2 is a conceptual configuration diagram of the character-string embellishment data base 12. In the diagram, the character-string embellishment data base 12 is a data base to retain various prescribed information regarding embellishments and includes a multitude of linking information storing areas 13, 13 of the same configuration, corresponding to the number of embellishments. Herein, two linking information storing areas 13, 13 are illustrated in the diagram. This is for avoiding convergence in the diagram for the sake of convenience.

Incidentally, "linking" means that various information stored in one linking information storing area 13 is correlated to each other (also referred to as "relation is established"). For example, each linking information storing area 13 includes a posture information storing area 14, an emotion information storing area 15, an avatar information storing area 16, and an embellishment information storing area 17, which means that various information stored in respective storing areas 14 to 17 is correlated to each other.

Herein, the posture information storing area 14 includes a direction storing area 14a and an angle storing area 14b, and information (direction information and angle information) to collate the detection results of the posture detecting section 10 is stored in the storing areas 14a and 14b. Similarly, the emotion information storing area 15 includes an emotion classification storing area 15a and an emotion level storing area 15b, and emotion information (classification and level of emotions) linked to the aforementioned collation information (direction information and angle information) is stored in the storing areas 15a and 15b. Similarly, the avatar information storing area 16 is an area to store fictitious persons (avatar) which have expressions corresponding to the posture. The avatar is described in detail later. Similarly, the embellishment information storing area 17 includes a character color storing area 17a, a character size storing space 17b, an additional character string storing area 17c, and an additional information storing area 17d, and embellishment information (character color, character size, additional character string, and additional information) linked to the aforementioned collation information (direction information and angle information) is stored in the storing areas 17a to 17d.

In the diagram, the direction information and the angle information corresponding to the static posture are exemplified as the information to collate the detection results of the posture detecting section 10, but is not limited to this. Further, information corresponding to the dynamic posture (amount corresponding to change in terms of direction or inclination) may be stored, in addition to the information corresponding to the static posture.

Figure 3:
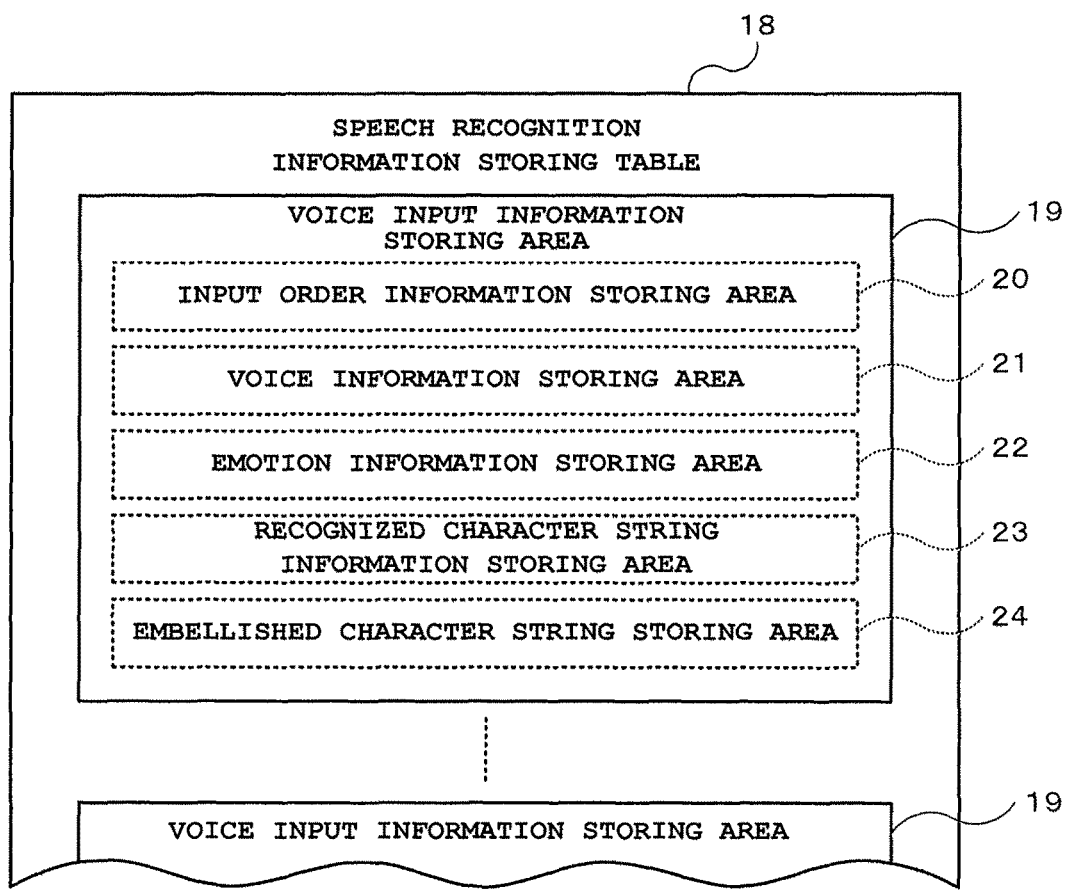
FIG. 3 is a conceptual configuration diagram of a speech recognition information storing table 18.

FIG. 3 is a conceptual configuration diagram of the speech recognition information storing table 18. In the diagram, the speech recognition information storing table 18 includes a plurality of voice input information storing areas 19, 19 corresponding to the number of speech units of the user, that is, the number of speech units partitioned by soundlessness. Herein, only two voice input information storing areas 19, 19 are illustrated in the diagram. This is for avoiding convergence in the diagram for the sake of convenience.

Each voice input information storing area 19, 19 is of the same configuration and includes an input order information storing area 20, a voice information storing area 21, an emotion information storing area 22, a recognized character string information storing area 23, and an embellished character string storing area 24.

In the input order information storing area 20, the order of input (that is, the order of speech) in one unit of voice data (unit of speech) inputted by the user is stored. In the voice information storing area 21, the voice data in the order of input is stored. Similarly, in the emotion information storing area 22, the emotion information is stored that is taken out from the character-string embellishment data base 12 in accordance with the detection results of the posture detecting section 10. Similarly, in the recognized character string information storing area 23, the character string information, which is the speech recognition results of the voice data in the order of input, is stored. Further, in the embellished character string storing area 24, the embellished character information, which is taken out from the character-string embellishment data base 12 in accordance with the detection results of the posture detecting section 10, is stored as the character strings added to the recognized character string.

Figure 4:
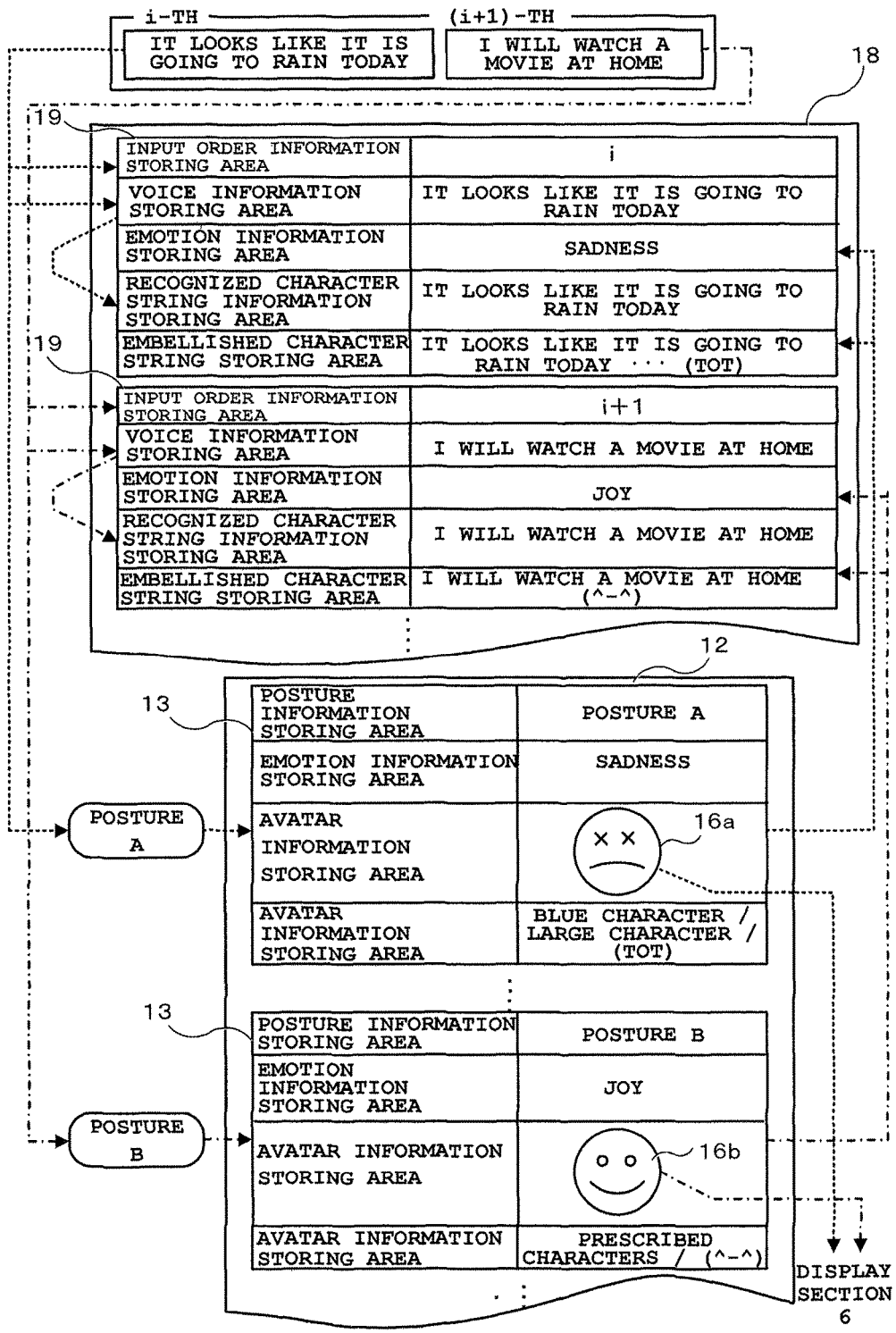
FIG. 4 is a diagram illustrating a relation between the character-string embellishment data base 12 and the speech recognition information storing table 18.

FIG. 4 is a diagram illustrating a relation between the character-string embellishment data base 12 and the speech recognition information storing table 18. It is assumed that "It looks like it is going to rain today. _I will watch a movie at home" is pronounced by the user for the purpose of speech recognition. Herein, an underscore (_) represents a soundlessness partition. In this case, the i-th speech is "It looks like it is going to rain today." and the (i+1)-th speech is "I will watch a movie at home".

In this case, the content ("It looks like it is going to rain today") of the i-th speech is stored in the voice information storing area 21 of a first voice input information storing area 19 in the speech recognition information storing table 18, and at the same time, "i" of the order of speech (order of input) is similarly stored in the input order information storing area 20 of the first voice input information storing area 19.

Similarly, the content ("I will watch a movie at home") of the (i+1)-th speech is stored in the voice information storing area 21 of a second voice input information storing area 19 in the speech recognition information storing table 18, and at the same time, "i+1" of the order of speech (order of input) is similarly stored in the input order information storing area 20 of the second voice input information storing area 19.

Then, the speech recognition results ("It looks like it is going to rain today") of the content ("It looks like it is going to rain today") of the i-th speech are stored in the recognized character string information storing area 23 of the first voice input information storing area 19. Similarly, the speech recognition results ("I will watch a movie at home") of the content ("I will watch a movie at home") of the (i+1)-th speech are stored in the recognized character string information storing area 23 of the second voice input information storing area 19.

When it is assumed that the user puts the posture of the cellular phone apparatus 1 into a predetermined posture (referred to as a posture A for convenience' sake) at the time of the i-th speech, the linking information storing area 13 of the character-string embellishment data base 12 is searched with this posture A as a clue. Similarly, when it is assumed that the user puts the posture of the cellular phone apparatus 1 into another predetermined posture (referred to as a posture B for convenience' sake) at the time of the (i+1)-th speech, the linking information storing area 13 of the character-string embellishment data base 12 is searched with this posture B as a clue.

Then, when the linking information storing area 13 which stores "posture A" is detected from the posture information storing area 14, storage information (emotion information and embellishment information) of the emotion information storing area 15 and the embellishment information storing area 17 in the linking information storing area 13 is transferred to the corresponding areas (the emotion information storing area 22 and the embellished character string storing area 24) of the voice input information storing area 19 corresponding to the i-th speech (the first voice input information storing area 19 described above). Similarly, when the linking information storing area 13 which stores "posture B" is detected from the posture information storing area 14, storage information (emotion information and embellishment information) of the emotion information storing area 15 and the embellishment information storing area 17 in the linking information storing area 13 is transferred to the corresponding areas (the emotion information storing area 22 and the embellished character string storing area 24) of the voice input information storing area 19 corresponding to the (i+1)-th speech (the second voice input information storing area 19 described above).

As a result, information of the order of speech (the order of input) ("i" and "i+1"), voice data ("It looks like it is going to rain today" and "I will watch a movie at home"), emotion information ("sadness" and "joy"), speech recognition results ("It looks like it is going to rain today" and "I will watch a movie at home"), and character strings with added embellishments ("It looks like it is going to rain today . . . (ToT)" and "I will watch a movie at home . . . (^-^)") are stored in the voice input information storing area 19 corresponding to the i-th speech (the first voice input information storing area 19 described above) and the voice input information storing area 19 corresponding to the (i+1)-th speech (the second voice input information storing area 19 described above). An avatar 16a whose expression represents sadness and an avatar 16b whose expression represents joy are respectively illustrated in the avatar information storing areas (corresponding to the avatar information storing area 16 in FIG. 2) of the two linking information storing areas 13 in the diagram. These avatars 16a and 16b are respectively displayed on the display section 6 in the cases of the posture A (sadness) and the posture B (joy) (see an avatar 26 described later in FIG. 7).

Figure 5:
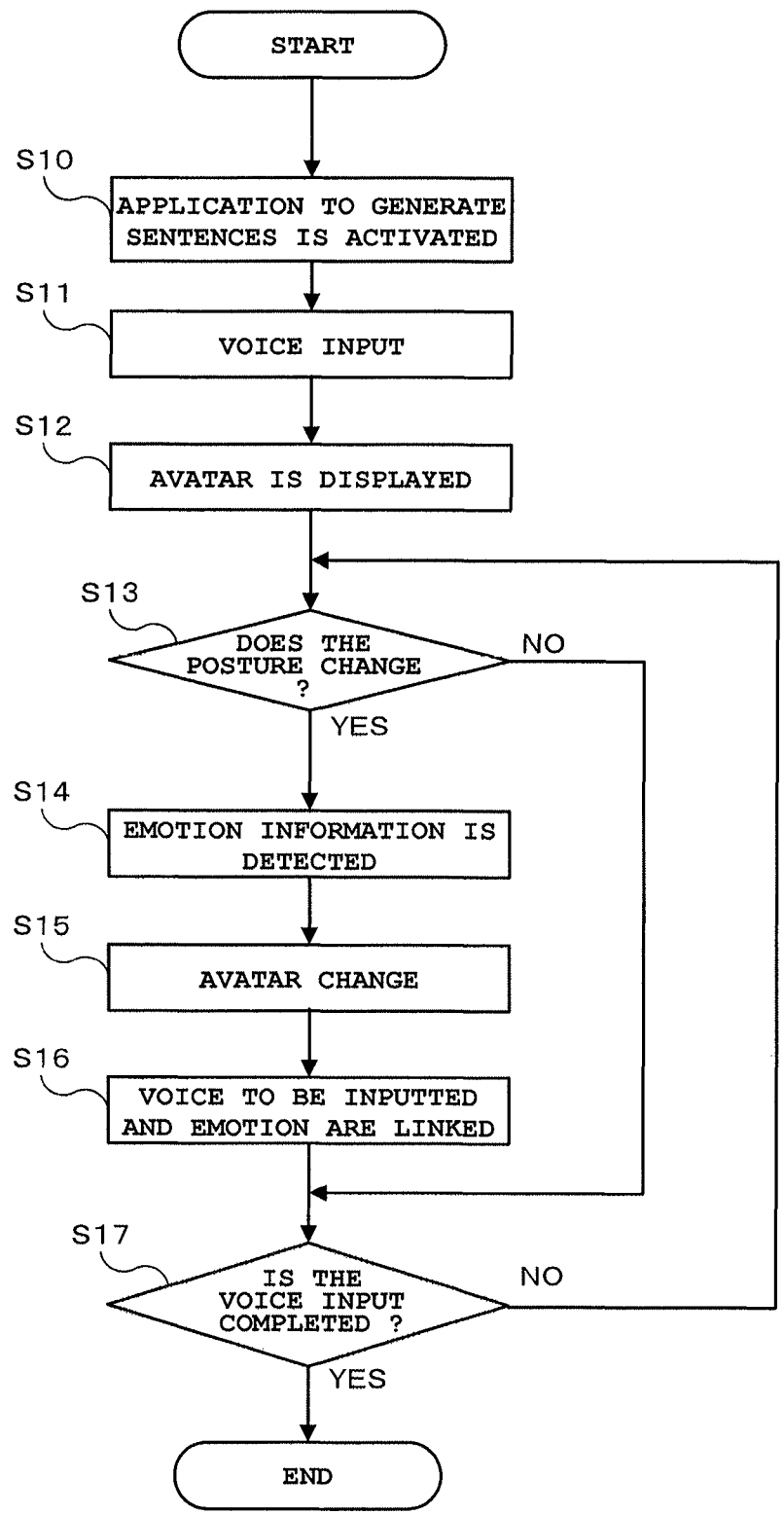
FIG. 5 is a diagram illustrating a flow of operations of the cellular phone apparatus 1.

FIG. 5 is a diagram illustrating the flow of operations of the cellular phone apparatus 1. The cellular phone apparatus 1 includes a mode at which sentences such as e-mail are generated based on the speech recognition (hereinafter, referred to as speech recognition mode). The speech recognition mode, for example, is executed in response to a predetermined button to be pushed down on the operating section 5. The main executor regarding the speech recognition mode is the control section 3. That is, the control section 3 reads out the application program for document preparation including e-mail from the ROM 3b into the RAM 3c in response to the predetermined button to be pushed down on the operating section 5 and executes the application program by means of the CPU 3a (Step S10). Similarly, the control section 3 reads out the control program for the speech recognition mode from the ROM 3b into the RAM 3c and sequentially executes the control program by means of the CPU 3a (Steps S11 to Step S17).

After the CPU 3a sequentially executes the respective processing of voice input (Step S11) and avatar display (Step S12) based on the control program, the CPU 3a performs the posture change judgment (Step S13). When the posture change judgment is YES, the CPU 3a sequentially executes respective processing of emotion information detection (Step S14), avatar alteration (Step S15), linking of input voice (Step S16), and voice input completion judgment (Step S17). In contrast, when the judgment result in the posture change judgment (Step S13) is NO, the CPU 3a skips the processing of Steps S14 to Step S16 and executes the processing of the voice input completion judgment (Step S17). Further, in either case, when the judgment result in the voice input completion judgment (Step S17) is NO, the processing returns to Step S13, and when the judgment result in the voice input completion judgment (Step S17) is YES, the CPU 3a finishes the program.

In the voice input processing at the Step S11, the CPU 3a converts the content of speech of the user, which is collected by the microphone 7a, into voice data and stores the voice data in the voice input information storing area 19 of the speech recognition information storing table 18. As is described above, the plurality of the voice input information storing areas 19 are provided for each speech unit (for example, unit of speech partitioned by soundlessness), so that the voice data corresponding to the i-th speech is stored in the voice information storing area 21 of the i-th voice input information storing area 19, and simultaneously, the information (that is, "i") of the order of speech is stored in the input order information storing area 20 of the i-th voice input information storing area 19. Thereafter, the operation is continuously carried out wherein the voice data corresponding to the (i+1)-th speech is stored in the voice information storing area 21 of the (i+1)-th voice input information storing area 19, and simultaneously, the information (that is, "(i+1)") of the order of speech is stored in the input order information storing area 20 of the (i+1) voice input information storing area 19, until the CPU 3a judges that the judgment result of the voice input completion judgment (Step S17) is YES.

In the avatar display processing at the Step S12, the CPU 3a displays an avatar on the display section 6. The avatar is generally meant by a fictitious person who appears on the screen as his/her alter ego. This avatar (fictitious person) is characterized in that various emotions can be displayed by facial expressions, which is preferable best mode in the embodiment of the present invention, but is not limited to this. Any mode except for the avatar may be applied when various emotions can be expressed. For example, marks or diagrams, which represent emotions with a smiling face, an angry face, or a crying face, may be applied, or character strings such as emoticons and pictographs which represent the emotions may be applied.

In the posture change judgment processing at the Step S13, the CPU 3a judges the presence or absence of the posture change of the cellular phone apparatus 1 based on the detection results of the posture detecting section 10. When the posture change is found, the processing proceeds to Step S14 where emotion information detection is made.

In the emotion information detection processing at the Step S14, the CPU 3a reads out emotion information corresponding to the posture of the cellular phone apparatus 1 from the character-string embellishment data base 12. As is described above, a multitude of linking information storing areas 13 are provided in the character-string embellishment data base 12. The posture information storing area 14, the emotion information storing area 15, the avatar information storing area 16, and the embellishment information storing area 17 are provided for respective linking information storing areas 13. In the emotion information detection processing at the Step S14, a first linking information storing area 13 is identified that stores posture information corresponding to the posture of the cellular phone apparatus 1, and the emotion information is taken out from the emotion information storing area 15 of the first linking information storing area 13.

In the avatar change processing at the Step S15, the CPU 3a takes out avatar information from the avatar information storing area 16 of the first linking information storing area 13, which is identified in the emotion information detection processing at the Step S14 and changes avatars on the display section 6 based on the avatar information.

In the processing of linking the input voice to emotions at the Step S16, the CPU 3a takes out the emotion information and the embellishment information from the emotion information storing area 15 and the embellishment information storing area 17 of the first linking information storing area 13, which is identified in the emotion information detection processing at the Step S14 and stores the emotion information and the embellishment information in the emotion information storing area 22 and the embellished character string storing area 24 of the speech recognition information storing table 18 of the corresponding order (for example, i-th).

Figure 6:
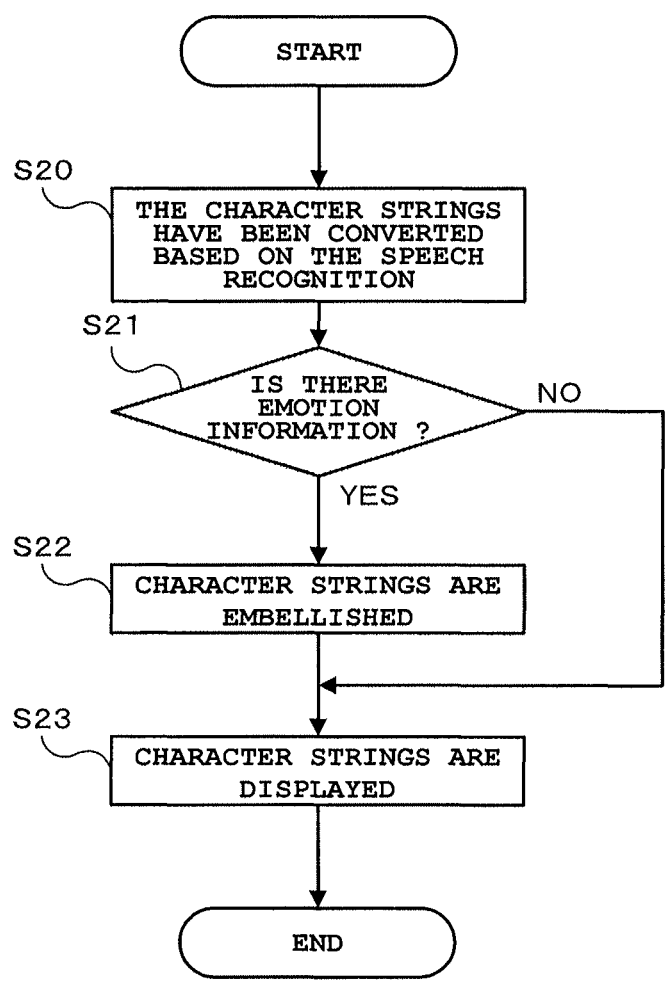
FIG. 6 is a flowchart illustrating operations of speech recognition processing.

FIG. 6 is a flowchart illustrating operations of speech recognition processing. In this flow, the CPU 3a sequentially reads out voice data stored in the speech recognition information storing table 18 (in the voice input information storing areas 19) and converts the voice data into character strings based on the speech recognition (Step S20), and stores the character string in the recognized character string information storing area 23 of the voice input information storing areas 19. The order of the voice data to be read out abides by the order (i-th, (i+1)-th, . . . ) to be stored in the input order information storing area 20 of the voice input information storing areas 19.

Subsequently, the CPU 3a judges whether or not the emotion information is linked to the voice data based on each reading order (Step S21). When the emotion information is stored in the emotion information storing area 22 of the i-th voice input information storing areas 19, the judgment result at the Step S21 is YES (linked), and when the emotion information is not stored in the emotion information storing area 22 of the i-th voice input information storing areas 19, the judgment result at the Step S21 is NO (not linked).

When the judgment result at the Step S21 is NO (not linked), the CPU 3a displays the character strings (character strings converted at the Step S20) stored in the recognized character string information storing area 23 of the voice input information storing areas 19 on the display section 6 as it is (Step S23). In contrast, when the judgment result at the Step S21 is YES (linked), the CPU 3a applies the embellishment for the character strings (character strings converted at the Step S20) stored in the recognized character string information storing area 23 of the voice input information storing areas 19 (Step S22), and displays the character strings with the embellishments on the display section 6 (Step S23). That is, when linked, the CPU 3a displays the character strings stored in the embellished character string storing area 24 of the voice input information storing areas 19 on the display section 6.

Figure 7:
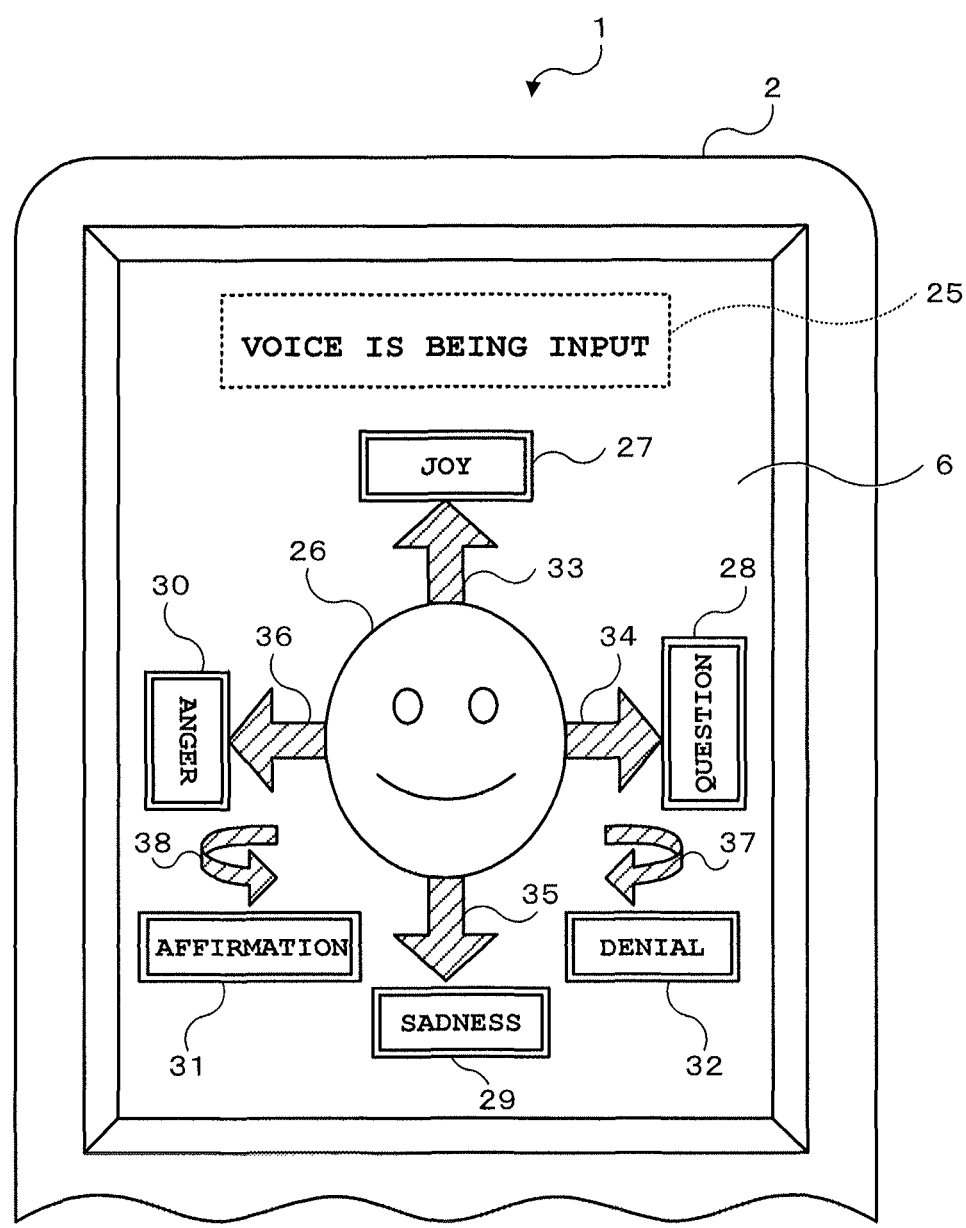
FIG. 7 is a diagram illustrating one example of an operation screen during voice input.

FIG. 7 is a diagram illustrating one example of an operation screen during voice input. In the diagram, a notification message 25 to inform the user that voice is being inputted is displayed in the vicinity of an upper portion of the display section 6, and an avatar 26 is displayed in the vicinity of central portion. Similarly, four emotion setting buttons 27 to 30 are displayed in the up-and-down and left-and-right directions, centering on the avatar 26. Further, an affirmation button 31 and a denial button 32 are respectively displayed in the lower left and lower right directions.

The emotion setting buttons 27 to 30 are aimed at setting the expressions of the avatar 26. For example, the emotion setting button 27 disposed above is aimed at setting the expressions of the avatar 26 to "joy", and the emotion setting button 28 disposed on the right is aimed at setting the expressions of the avatar 26 to "question", and the emotion setting button 29 disposed below is aimed at setting the expressions of the avatar 26 to "sadness", and the emotion setting button 30 disposed on the left is aimed at setting the expressions of the avatar 26 to "anger". Similarly, the affirmation button 31 is aimed at determining (affirming) the setting for the expression with regards to the avatar 26, and the denial button 32 is aimed at refusing (denying) the setting for the expression with regards to the avatar 26.

When the display section 6 is equipped with the touch screen, a variety of buttons including those (the emotion setting buttons 27 to 30, the affirmation button 31, and the denial button 32) can directly be operated with fingers and the like. That is, when the user desires to add the embellishments representing a desired emotion to the voice data during the voice input, the user may touch the corresponding emotion button (any of the emotion setting buttons 27 to 30). Then, when the avatar 26 is put into the desired expression, the user touches the affirmation button 31. When the avatar 26 is not put into the desired expression, the user touches the denial button 32, and then, the user tries touching the emotion button (any of the emotion setting buttons 27 to 30) again.

However, the touch operation, in which a variety of buttons including those (the emotion setting buttons 27 to 30, the affirmation button 31, and the denial button 32) are directly operated, impedes the precious effects with regards to voice input (handwork is not required). Accordingly, in the embodiment of the present invention, the operation for a variety of buttons described above (the emotion setting buttons 27 to 30, the affirmation button 31, and the denial button 32) can be executed merely by changing the posture of the cellular phone apparatus 1.

Four arrow symbols 33 to 36 extending from the up-and-down and the left-and-right of the avatar 26, and two curvilinear arrow symbols 37 and 38 at the lower left and the lower right are instructive displays for change in posture of the cellular phone apparatus 1 with respect to the user. The user can carry out the desired button operation by intuitively changing the posture of cellular phone apparatus 1 based on the presentation of the instructive display.

For example, when the expression of the avatar 26 needs to be set to "joy", the posture change operation, in which the cellular phone apparatus 1 is inclined in the direction of the arrow symbol 33, may be carried out. In this case, the inclination directions are made up of two directions, which include the direction that the upper end portion of the cellular phone apparatus 1 comes close to the user's side, and the direction that the upper end portion of the cellular phone apparatus 1 is detached away from the user's side (suitability of the two directions is described later). Similarly, when the expression of the avatar 26 needs to be set to "question", the posture change operation, in which the cellular phone apparatus 1 is inclined in the direction of the arrow symbol 34, may be carried out. In this case, the inclination directions are made up of two directions, which include the direction that the right end portion of the cellular phone apparatus 1 comes close to the user's side, and the direction that the right end portion of the cellular phone apparatus 1 is detached away from the user's side (as above). Similarly, when the expression of the avatar 26 needs to be set to "sadness", the posture change operation, in which the cellular phone apparatus 1 is inclined in the direction of the arrow symbol 35, may be carried out. In this case, the inclination directions are made up of two directions, which include the direction that the lower end portion of the cellular phone apparatus 1 comes close to the user's side, and the direction that the lower end portion of the cellular phone apparatus 1 is detached away from the user's side (as above). Similarly, when the expression of the avatar 26 needs to be set to "anger", the posture change operation, in which the cellular phone apparatus 1 is inclined in the direction of the arrow symbol 36, may be carried out. In this case, the inclination directions are made up of two directions, which include the direction that the left end portion of the cellular phone apparatus 1 comes close to the user's side, and the direction that the left end portion of the cellular phone apparatus 1 is detached away from the user's side (as above). The suitability of the two directions is reviewed. Generally, when the one end side of an object is inclined in a certain direction, the other side moves in the opposite direction (that is, inclined in the reverse direction). For this reason, when the inclination is detected based on the effectiveness of the two directions, there occurs confusion in the posture judgment. For example, when the upper end portion of the cellular phone apparatus 1 is inclined in such a manner as to come close to the user's side, the lower end portion moves in the reverse direction. In this case, it is impossible to judge that any of "joy" and "sadness" is set. Accordingly, any one of the two directions needs to be effective for practical use. For example, the posture change operation regarding "joy" is made in the direction that the upper end portion of the cellular phone apparatus 1 comes close to the user's side, and the posture change operation regarding "question" is made in the direction that the right end portion of the cellular phone apparatus 1 comes close to the user's side, and the posture change operation regarding "sadness" is made in the direction that the lower end portion of the cellular phone apparatus 1 comes close to the user's side, and the posture change operation regarding "anger" is made in the direction that the left end portion of the cellular phone apparatus 1 comes close to the user's side. Alternatively, the direction of bringing the cellular phone apparatus 1 close to the user's side may be replaced with the direction of separating the cellular phone apparatus 1 on the side opposite to the user's side. The point lies in standardization in which respective posture change operations are made based on one same direction (the direction of bringing the cellular phone apparatus 1 close to the user's side, or the direction of separating the cellular phone apparatus 1 on the side opposite to the user's side). This prevents the confusion in posture judgment.

Then, when the expression of the avatar 26 is desirably given, the posture of the cellular phone apparatus 1 is changed in the counterclockwise direction corresponding to the curvilinear arrow symbol 38 disposed at the lower left. When the expression of the avatar 26 is not desirably given, the posture of the cellular phone apparatus 1 is changed in the clockwise direction corresponding to the curvilinear arrow symbol 37 disposed at the lower right. Herein, when the expression of the avatar 26 is set, the posture change operation, in which the cellular phone apparatus 1 is "inclined", is made, but the present invention is not limited to this operation. The posture change operation may be made such a manner that the direction of the cellular phone apparatus 1 is maintained while the cellular phone apparatus 1 is slid in the arrow symbols 33 to 36. That is, the posture change operation may be made such a manner that, when the expression of the avatar 26 needs to be set to "joy", the cellular phone apparatus 1 is slid upwardly, and when the expression of the avatar 26 needs to be set to "question", the cellular phone apparatus 1 is slid rightward, and when the expression of the avatar 26 needs to be set to "sadness", the cellular phone apparatus 1 is slid downwardly, and when the expression of the avatar 26 needs to be set to "anger", the cellular phone apparatus 1 is slid leftward. Hereinafter, for convenience' sake in terms of the description, the posture change operation based on "inclination" is exemplified.

Thus, in the embodiment of the present invention, the expressions of the avatar 26 can be changed to the emotions in accordance with the posture of the cellular phone apparatus 1 by merely changing the posture (inclination) of the cellular phone apparatus 1 during the voice input. Then, the voice to be inputted can be converted to the character strings based on the speech recognition, and the embellishments corresponding to the emotions of the avatar 26 can be added to the character strings and displayed on the display section 6, and the character strings with the embellishments can be transmitted, for example, by means of e-mail.

Needless to say, the operation screen during the voice input is not limited to the aforementioned illustration (FIG. 7). For example, the emotions such as "joy", "question", "sadness", and "anger" are mere one example, and part of the emotions or the entire emotions may be replaced with other emotions. Similarly, the number of emotions is not limited to four, which are exemplified by "joy", "question", "sadness", and "anger". The number of emotions may be plural and may be two, three, or five or more.

In the description above, there is no mention about "level" of emotions. This is aimed at simplifying the description. Hereinafter, an embodiment in view of "level" of emotions will be described.

Figure 8:
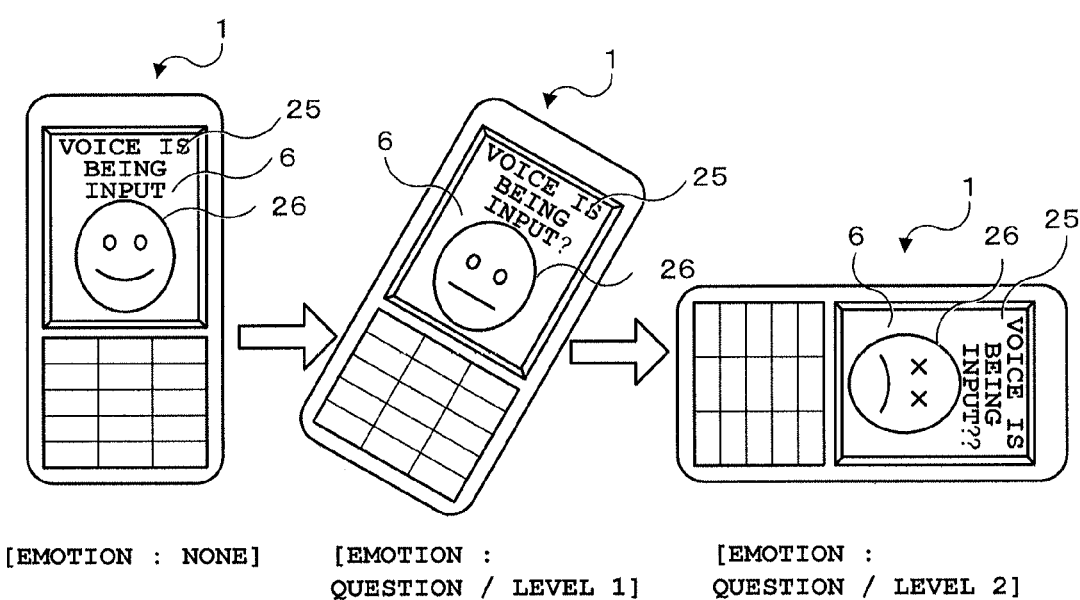
FIG. 8 is a diagram illustrating an example of operations in a case where "level" of emotions is applied.

FIG. 8 is a diagram illustrating an example of operations when "level" of emotions is applied. In the diagram, a notification message 25 to clearly demonstrate that voice is being inputted is displayed in the vicinity of the upper portion of the display section 6 of the cellular phone apparatus 1, and the avatar 26 is displayed in the vicinity of the central portion of the display section 6. The expression of the avatar 26 is expressionless (motionless) at first (see the cellular phone apparatus 1 on the left end).

In FIG. 8, in order to simplify the diagram, the emotion setting buttons 27 to 30, the affirmation button 31, the denial button 32, the arrow symbols 33 to 36, and the curvilinear arrow symbols 37 and 38, which are described in FIG. 7, are omitted. Accordingly, in the example of the operations in the diagram, as is the same case with FIG. 7 described above, when the upper end portion of the cellular phone apparatus 1 is brought close to the user's side, the expression of the avatar 26 is changed to "joy", and when the right end portion of the cellular phone apparatus 1 is brought close to the user's side, the expression of the avatar 26 is changed to "question", and when the lower end portion of the cellular phone apparatus 1 is brought close to the user's side, the expression of the avatar 26 is changed to "sadness", and when the left end portion of the cellular phone apparatus 1 is brought close to the user's side, the expression of the avatar 26 is changed to "anger".

In FIG. 8, the example is representatively illustrated where the cellular phone apparatus 1 is inclined in the direction that the right end portion of the cellular phone apparatus 1 is brought close to the user's side. However, it seems that "right rotation" is made in the diagram. This is for convenience of illustration.

The point in the example of operations lies in changeability in terms of level of respective emotions (question, joy, sadness and anger). For example, when the inclination is represented in a predetermined amount (approximately 45 degrees), "question" is at a level 1. When the inclination is larger than the predetermined amount (approximately 90 degrees), "question" is at a level 2 which is higher than the level 1. Herein, two-stage level is applied. However, multi-stage level, which is three-stage level or higher, can be applied by subdividing the change of the posture (inclination).

The avatar 26 displayed on the cellular phone apparatus 1 in the center of the diagram is at the level 1, and the expression of the avatar 26 represents a slight question. In contrast, the avatar 26 displayed on the cellular phone apparatus 1 at the right end of the diagram is at the level 2, and the expression of the avatar 26 represents a serious question. Accordingly, the user can intuitively read a difference in levels of emotions based on the expressions of the avatar 26.

Figure 9:
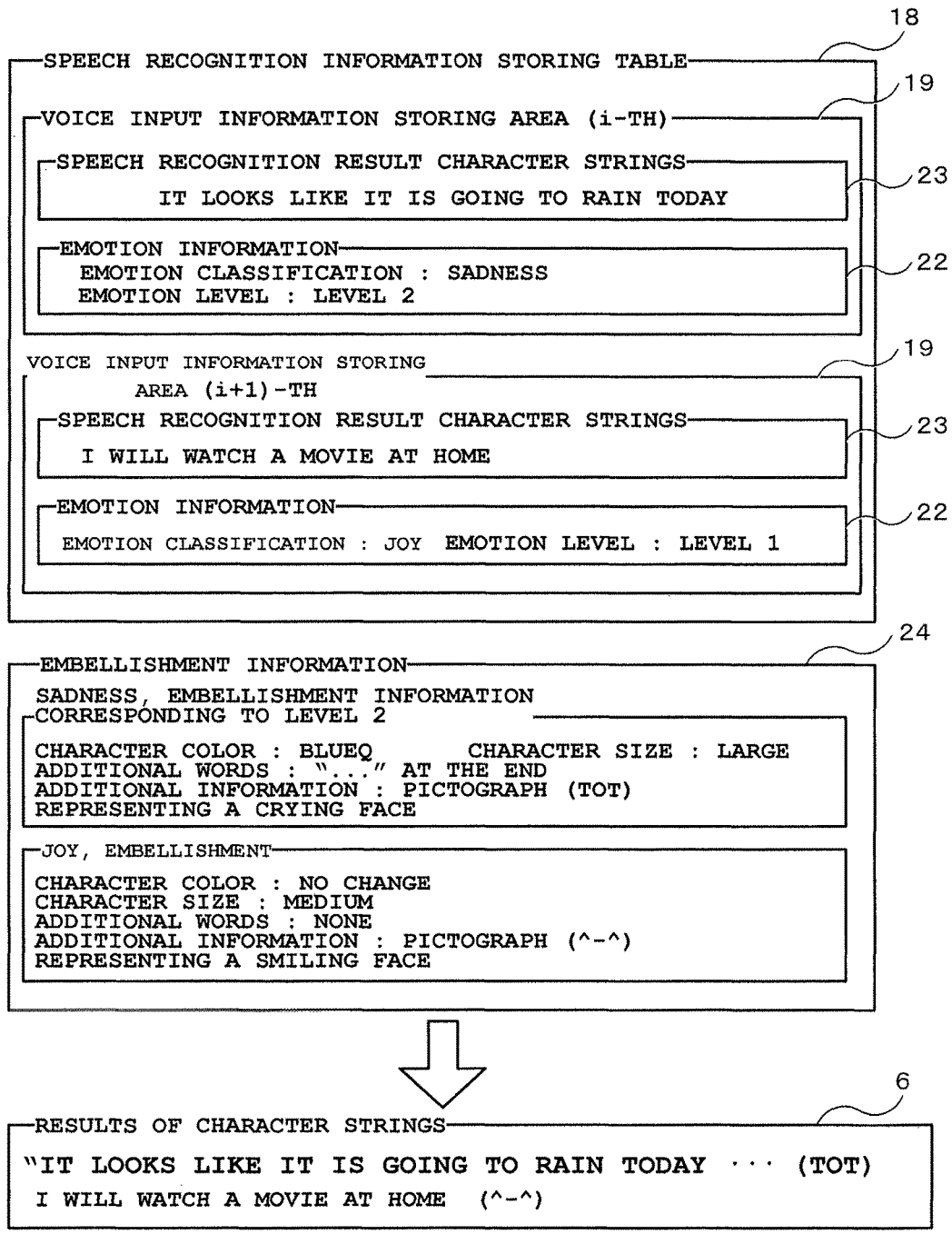
FIG. 9 is a diagram illustrating a practical example when the levels of emotions are changed.

FIG. 9 is a diagram illustrating the practical example where the levels of the emotions are changed. In the diagram, at present, the content of the i-th speech is set to "It looks like it is going to rain today" (speech recognition result: "It looks like it is going to rain today"), and the content of the (i+1)-th speech is set to "I will watch a movie at home" (speech recognition result: "I will watch a movie at home"), and the i-th emotion is set to "sadness/level 2", and the (i+1)-th emotion is set to "joy/level 1".

In this case, the user has only to incline the posture of the cellular phone apparatus 1 corresponding to "sadness/level 2" when the speech recognition is applied to the content of the i-th speech ("It looks like it is going to rain today"). Similarly, the user has only to incline the posture of the cellular phone apparatus 1 corresponding to "joy/level 1" when the speech recognition is applied to the content of the (i+1)-th speech ("I will watch a movie at home").

In this manner, as is illustrated in the diagram, the speech recognition result of "It looks like it is going to rain today" and the emotion information of "sadness/level 2" are stored in the i-th voice input information storing area 19 of the speech recognition information storing table 18. Similarly, the speech recognition result of "I will watch a movie at home" and the emotion information of "joy/level 1" are stored in the (i+1)-th voice input information storing area 19 of the speech recognition information storing table 18.

At present, the embellishment information corresponding to "sadness/level 2" and "joy/level 1" is stored in the embellishment information storing area 17 to be illustrated. That is, it is assumed that, with respect to "sadness/level 2", the character color is blue, and the character size is large, and the additional words (character strings) are "• • •", and the additional information is the emoticon ("(ToT)") representing a crying face, and with respect to "joy/level 1", the character color remains at a prescribed value, the character size is medium, and there is no additional words (character strings), and the additional information is the emoticon ("(^-^)") representing a smiling face. In this case, the final character strings (character strings displayed on the display section 6) are represented in the diagram.

That is, the first character strings ("It looks like it is going to rain today") are displayed as the blue, large-size character strings, and "• • •" and "(ToT)" following the character strings are added, and further, the following character strings ("I will watch a movie at home") are displayed as medium-size character strings in prescribed color, and ""(^-^)""" following the medium-size character strings is added. Thus, in the example of operations, the level of emotions can be designated, so that character strings with exquisite feeling can be generated.

In the example of operations, the level of emotions is set in accordance with the magnitude of posture (inclination), but is not limited to this mode. For example, the level of emotions may be set in accordance with the number of times that the same posture is repeated. For example, it may be such that the level 1 is represented by inclining the cellular phone apparatus 1 one time in a predetermined direction, and the level 2 is represented by continuously inclining the cellular phone apparatus 1 two times in the predetermined direction, and the n-th level is represented by continuously inclining the cellular phone apparatus 1 n times in the predetermined direction. Alternatively, the mechanism of lowering the level set in advance may be incorporated. For example, it may be such that, when the cellular phone apparatus 1 is inclined n times in the predetermined direction and the cellular phone apparatus 1 is inclined m times in the direction opposite to the predetermined direction, the level of emotions is lowered by m steps, and then, n is equal to or higher than m. When n is equal to m, the level of the emotion is reset (that is, the setting of emotions is released).

As is described above, according to the embodiment of the present invention, the following effects can be achieved.

(1) The simple operation, in which the posture of the cellular phone apparatus 1 is changed during the voice input, allows a desired embellishment to be inputted without being concerned about the surroundings and further without impeding the voice input.

(2) The embellishments corresponding to the emotions of the user can be added, and the emotions are represented by the expressions of the avatar, so that error in inputting the emotions can intuitively be recognized based on the expressions of the avatar, and the error can be corrected swiftly.

(3) The speech recognition result and the emotion are linked, so that the embellishment corresponding to the emotion can automatically be applied to the speech recognition result.

(4) According to the aforementioned (1) to (3), the sentences with the embellishments which reflect the user's emotions, which is difficult to be generated merely based on the voice input, can be generated based on the simple operation only, without being concerned about the surroundings and without impeding the voice input.

In the description above, the embellishment is applied for each speech unit (for example, a unit which is partitioned by soundlessness), but is not limited to this. For example, the embellishment may be applied for the entire sentence. In this case, the background color of the sentence may be changed, or the embellishment with an image to be added may be applied. Similarly, in the description above, the embellishment corresponding to the user's "emotions" is applied. However, a mode except for the emotions, for example, embellishment corresponding to "seasons" such as spring, summer, fall, and winter may be applied. In this case, for example, the seasons may be represented by changing the clothes of the avatar or backgrounds, or the photographs or pictures representing the season may be applied in place of the avatar. The embellishment for each season, for example, may be made up of the character strings, symbols, marks, and images representing the season. Similarly, in the description above, the setting for the emotions and the embellishments are made by detecting the posture of the cellular phone apparatus 1. Besides this, for example, the setting may be applied for the operations required for the speech recognition (selection or shuffle operation in a case where there are a plurality of candidates regarding the storage of the sentences or speech recognition results). Alternatively, the technology disclosed by Patent Document 1 described at the beginning of the present specification may be applied. That is, the technology disclosed by Patent Document 1 is aimed at assuming the emotions involved in the voice. The expressions of the avatar may be changed based on the assumption results. In this manner, the user can immediately notice an error in assumption based on the visual expression of the avatar, which is preferable in that the error can immediately be corrected by changing the posture of the cellular phone apparatus 1. Similarly, in the description above, the example where the present invention is applied to the cellular phone apparatus 1 has been described. However, the present invention is not limited to this. The present invention can be applied for an electronic apparatus which includes a character string input function with the use of the speech recognition and an embellishment addition function of adding the embellishments to the character strings. For example, the present invention can be applied for smart phones, tablet-type personal computers, notebook personal computers, electronic books, game machines, digital cameras, navigation apparatuses and the like.

Hereinafter, the features of the present invention will be described.

Part or all of the aforementioned embodiment of the present invention can be described below. However, the present invention is not limited to the description below.

(Supplementary Note 1)

Figure 10:
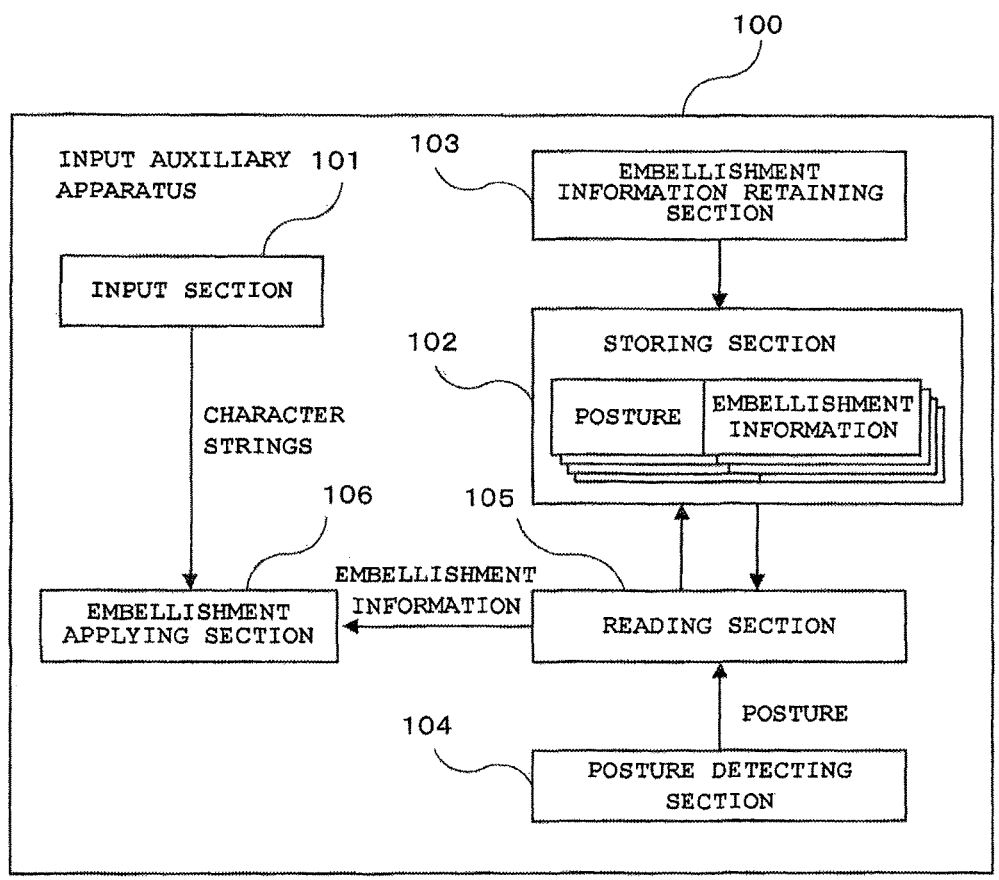
FIG. 10 is a configuration diagram of Supplementary Note 1.

FIG. 10 is a configuration diagram for Supplementary Note 1. As illustrated in the diagram, the input auxiliary apparatus 100 described in Supplementary Note 1 comprises:

an input section 101 for inputting character strings;

an embellishment information retaining section 103 for retaining embellishment information on a plurality of postures in a storing section 102 in advance in a manner to link each posture with the embellishment information;

a posture detecting section 104 for detecting the posture;

a reading section 105 for reading out the embellishment information linked with the posture detected by the posture detecting section 104 from the storing section 102; and an embellishment applying section 106 for applying the embellishment information read out by the reading section 105 to the character strings.

(Supplementary Note 2)

An input auxiliary apparatus described in Supplementary Note 2 is the input auxiliary apparatus according to claim 1, wherein the input section includes a speech recognition section for recognizing voice data based on speech recognition and converting the voice data to character strings, or a taking section for taking in an external signal corresponding to recognition results of the speech recognition section.

(Supplementary Note 3)

An input auxiliary apparatus described in Supplementary Note 3 is the input auxiliary apparatus according to claim 1, wherein the embellishment information retaining section retains emotion information or season information linked with the embellishment information.

(Supplementary Note 4)

An input auxiliary apparatus described in Supplementary Note 4 is the input auxiliary apparatus according to claim 1, wherein the embellishment information retaining section retains the emotion information or the season information linked with the embellishment information and includes a display control section for changing a display mode of a display section based on the emotion information or the season information.

(Supplementary Note 5)

An input auxiliary method described in Supplementary Note 5 includes:

an input step of inputting character strings;

an embellishment information retaining step of retaining embellishment information on a plurality of postures in a storing section in advance in a manner to link each posture with the embellishment information;

a posture detecting step of detecting the posture;

a reading step of reading out the embellishment information linked with the posture detected by the posture detecting section from the storing section; and an embellishment applying step of applying the embellishment information read out by the reading step to the character strings.

(Supplementary Note 6)

A non-transitory computer-readable storage medium having a program stored thereon described in Supplementary Note 6 which causes a computer to function as:

an input section for inputting character strings;

an embellishment information retaining section for retaining embellishment information on a plurality of postures in a storing section in advance in a manner to link each posture with the embellishment information;

a posture detecting section for detecting the posture;

a reading section for reading out the embellishment information linked with the posture detected by the posture detecting section from the storing section; and an embellishment applying section for applying the embellishment information read out by the reading section to the character strings.

DESCRIPTION OF REFERENCE NUMERALS 100 input auxiliary apparatus
101 input section
102 storing section
103 embellishment information section
104 posture detecting section
105 reading section
106 embellishment applying section

The invention claimed is:

1. An input auxiliary apparatus comprising:
a voice input section for inputting a voice;
an embellishment information retaining section for retaining embellishment information on a plurality of posture patterns in a storing section in advance such that each piece of the embellishment information links each posture pattern;
a posture detecting section for detecting posture; and
a control section for being operable as:
by a speech recognition instruction by a user, recognizing, for each speech unit, voice inputted from the voice input section, as a character string,
determining, for the each speech unit, a posture pattern instructed by the user, based the posture detected by the posture detecting section during the speech recognition,
reading out an embellishment information linked with the posture pattern determined for the each speech unit from the storing section; and
applying the embellishment information read out for each speech unit to the character string recognized for the each speech unit,
wherein the embellishment information is character color of the character string, character size of the character string, and an emoticon or a pictograph added following the character string,
wherein the embellishment information retaining section also retains emotion information or season information such that each piece of the emotion information or season information is linked with the each posture pattern,
wherein, during the speech recognition, the control section sequentially changes a display mode of a display section based on a piece of the emotion information or season information linked with a posture pattern including displacement of the posture being detected by the posture detecting section, and
wherein the display mode is an avatar, or a mark or a diagram which represents an emotion.

2. The input auxiliary apparatus according to claim 1 further comprising a receiving section for receiving in an external signal corresponding to recognition results of the speech recognition section.

3. The input auxiliary apparatus according to claim 1, wherein, in the emotion information or season information, different emotions or seasons are retained for different directions included in the plurality of posture patterns, and different levels of an emotion or a season corresponding to an arbitrary direction are retained for different angles of the arbitrary direction.

4. An input auxiliary method comprising:
a step of inputting a voice;
a step of retaining embellishment information on a plurality of posture patterns in a storing section in advance such that each piece of the embellishment information links each posture pattern;
a step of detecting the posture;
a step of determining, for the each speech unit, a posture pattern instructed by the user, based the detected posture during the speech recognition;
a step of reading out an embellishment information linked with the posture pattern determined for the each speech unit from the storing section; and
a step of applying the embellishment information read out for the each speech unit to the character string recognized for the each speech unit,
wherein the embellishment information is character color of the character string, character size of the character string, and an emoticon or a pictograph added following the character string,
wherein the embellishment information retaining step also retains emotion information or season information such that each piece of the emotion information or season information is linked with each posture pattern,
wherein, during the speech recognition, a display mode of a display section is changed based on a piece of the emotion information or season information linked with a posture pattern including displacement of the posture being detected, and
wherein the display mode being an avatar, or a mark or a diagram which represents an emotion.

5. A non-transitory computer-readable storage medium having a program stored thereon which causes a computer to function as:
a voice input section for inputting voice;
an embellishment information retaining section for retaining embellishment information on a plurality of posture patterns in a storing section in advance such that each piece of the embellishment information links each posture pattern;
a posture detecting section for detecting posture; and
a control section for being operable as:
by a speech recognition instruction by a user, recognizing, for each speech unit, voice inputted from the voice input section, as a character string;
determining, for the each speech unit, a posture pattern instructed by the user, based the posture detected by the posture detecting section during the speech recognition,
reading out an embellishment information linked with the posture pattern determined for the each speech unit from the storing section; and
applying the embellishment information read out for the each speech unit to the character string recognized for the each speech unit,
wherein the embellishment information is character color of the character string, character size of the character string, and an emoticon or a pictograph added following the character string,
wherein the embellishment information retaining section also retains emotion information or season information such that each piece of the emotion information or season information is linked with the each posture pattern,
wherein, during the speech recognition, the control section sequentially changes a display mode of a display section based on a piece of the emotion information or season information linked with a posture pattern including displacement of the posture being detected by the posture detecting section, and
wherein the display mode being an avatar, or a mark or a diagram which represents an emotion.

* * * * *